(12) United States Patent
Wakamori

(10) Patent No.: US 6,370,755 B1
(45) Date of Patent: Apr. 16, 2002

(54) METHOD FOR PRODUCING A FRICTION PLATE

(75) Inventor: Tetsuya Wakamori, Iwata (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/296,294

(22) Filed: Apr. 22, 1999

(30) Foreign Application Priority Data

Apr. 23, 1998 (JP) ............................................. 10-113333

(51) Int. Cl.⁷ ................................................. B23P 17/00
(52) U.S. Cl. ...................... 29/412; 192/107 R; 156/220
(58) Field of Search ................. 29/469.5, 412, 29/417; 192/107 R; 156/220, 299, 581

(56) References Cited

U.S. PATENT DOCUMENTS

| | | | | |
|---|---|---|---|---|
| 4,260,047 A | * | 4/1981 | Nels ...................... | 192/107 R |
| 5,094,331 A | * | 3/1992 | Fujimoto et al. ........ | 192/107 R |
| 5,460,255 A | * | 10/1995 | Quigley ................... | 192/107 R |
| 5,571,372 A | * | 11/1996 | Miyaishi et al. ............ | 156/515 |
| 5,605,210 A | * | 2/1997 | Koike et al. ............ | 192/107 R |
| 5,776,288 A | * | 7/1998 | Stefanutti et al. ........ | 192/107 R |
| 5,897,737 A | * | 4/1999 | Quigley ....................... | 156/299 |
| 6,019,205 A | * | 2/2000 | Willwerth et al. ...... | 192/107 R |

* cited by examiner

Primary Examiner—David P. Bryant
Assistant Examiner—Jermie E. Cozart
(74) Attorney, Agent, or Firm—Miles & Stockbridge P.C.

(57) ABSTRACT

There is provided a method for producing a friction plate, capable of improving the throughput of friction material and reducing the time and work required for adhering friction material segments to a core plate. The method produces a friction plate having oil grooves communicating between the internal periphery and the external periphery, by fixing friction material segments formed from a friction material to a core plate, and is featured by forming the oil grooves by plastic working of the friction material and fixation of the friction material segments with predetermined gaps therebetween to the core plate.

6 Claims, 6 Drawing Sheets

METHOD FOR PRODUCING A FRICTION PLATE

BACKGROUND OF THE INVENTION

1. Field of the Invention

The present invention relates to a method for producing a friction plate adapted for use in an automatic transmission or a lock-up clutch of vehicles such as automobiles and an apparatus therefor.

2. Related Background Art

In the prior art, plural segments of friction material are adhered to a core plate with a predetermined gap between the segments, thereby forming oil grooves for lubricating oil on the friction plate.

FIG. 8 shows an example of such conventional method for producing a friction plate. Segments of the friction material are prepared for example by punching from a tape 5 of the friction material. The segments 3 of the friction material are fixed on a core plate 1 with gaps 4 in the circumferential direction to form a friction plate 10, and such gaps 4 constitute oil grooves.

The above-described conventional method for forming the friction plate has been associated with the following drawbacks:

1) As the plural segments of the friction material are extracted from the friction material tape and are adhered with predetermined gaps to the core plate, there are required time and work for forming the oil grooves of the required number; and 2) Also as it is necessary to obtain the friction material segments of a relatively large number from the tape, the throughput of the material such as the tape of the friction material is undesirably low, resulting in a significant waste of the material.

SUMMARY OF THE INVENTION

In consideration of the foregoing, an object of the present invention is to provide a method for producing the friction plate capable of improving the throughput of the friction material and reducing the time required for adhering the segments of the friction material to the core plate.

For attaining the above-mentioned object, the present invention is firstly featured by a method for producing a friction plate formed by fixing friction material segments, formed from a friction material, to a core plate and having oil grooves communicating between the internal periphery and the external periphery of the segments:

wherein the oil grooves are formed by plastic working of the friction material and fixation of the friction material segments with a predetermined gap therebetween to the core plate.

Also the present invention is secondly featured by a method for producing a friction plate formed by fixing friction material segments, formed from a friction material, to a core plate and having oil grooves communicating between the internal periphery and the external periphery of the segments:

wherein the oil grooves are formed by cutting of the friction material and fixation of the friction material segments with a predetermined gap therebetween to the core plate.

Also the present invention is thirdly featured by an apparatus for producing a friction plate formed by fixing friction material segments, formed from a friction material, to a core plate and having oil grooves communicating between the internal periphery and the external periphery of the segments, comprising:

means for punching a band-shaped friction material to obtain plural friction material segments;

means for holding the friction material segments by stacking on a metal mold or a jig and pushing out the friction material segments in succession to a side opposite to the metal mold; and means for pressing and adhering the friction material segments to the core plate;

wherein the oil grooves are formed by plastic working of the friction material and fixation of the friction material segments with a predetermined gap therebetween to the core plate.

Also the present invention is fourthly featured by an apparatus for producing a friction plate formed by fixing friction material segments, formed from a friction material, to a core plate and having oil grooves communicating between the internal periphery and the external periphery of the segments, comprising:

means for punching a band-shaped friction material to obtain plural friction material segments;

means for holding the friction material segments by stacking on a metal mold or a jig and pushing out the friction material segments in succession to a side opposite to the metal mold; and means for pressing and adhering the friction material segments to the core plate;

wherein the oil grooves are formed by cutting of the friction material and fixation of the friction material segments with a predetermined gap therebetween to the core plate.

Also the present invention is fifthly featured by a friction plate formed by fixing friction material segments, formed from a friction material, to a core plate and having oil grooves communicating between the internal periphery and the external periphery of the segments:

wherein the oil grooves are formed by plastic working of the friction material and fixation of the friction material segments with a predetermined gap therebetween to the core plate.

Also the present invention is sixthly featured by a friction plate formed by fixing friction material segments, formed from a friction material, to a core plate and having oil grooves communicating between the internal periphery and the external periphery of the segments:

wherein the oil grooves are formed by cutting of the friction material and fixation of the friction material segments with a predetermined gap therebetween to the core plate.

Also the present invention is seventhly featured by a friction plate formed by fixing friction material segments, formed from a friction material, to a core plate and having oil grooves communicating between the internal periphery and the external periphery of the segments:

wherein the friction material segments are fixed with a predetermined gap therebetween to the core plate and then subjected to cutting for forming the oil grooves.

The time required for adhering work can be reduced since the friction material segments of a number fewer than in the prior art are adhered to the core plate. Also the throughput of the material can be improved.

DESCRIPTION OF THE PREFERRED EMBODIMENTS

Now the present invention will be explained in detail by preferred embodiments thereof, with reference to the attached drawings, wherein corresponding components are represented by corresponding numbers.

Figure 1:
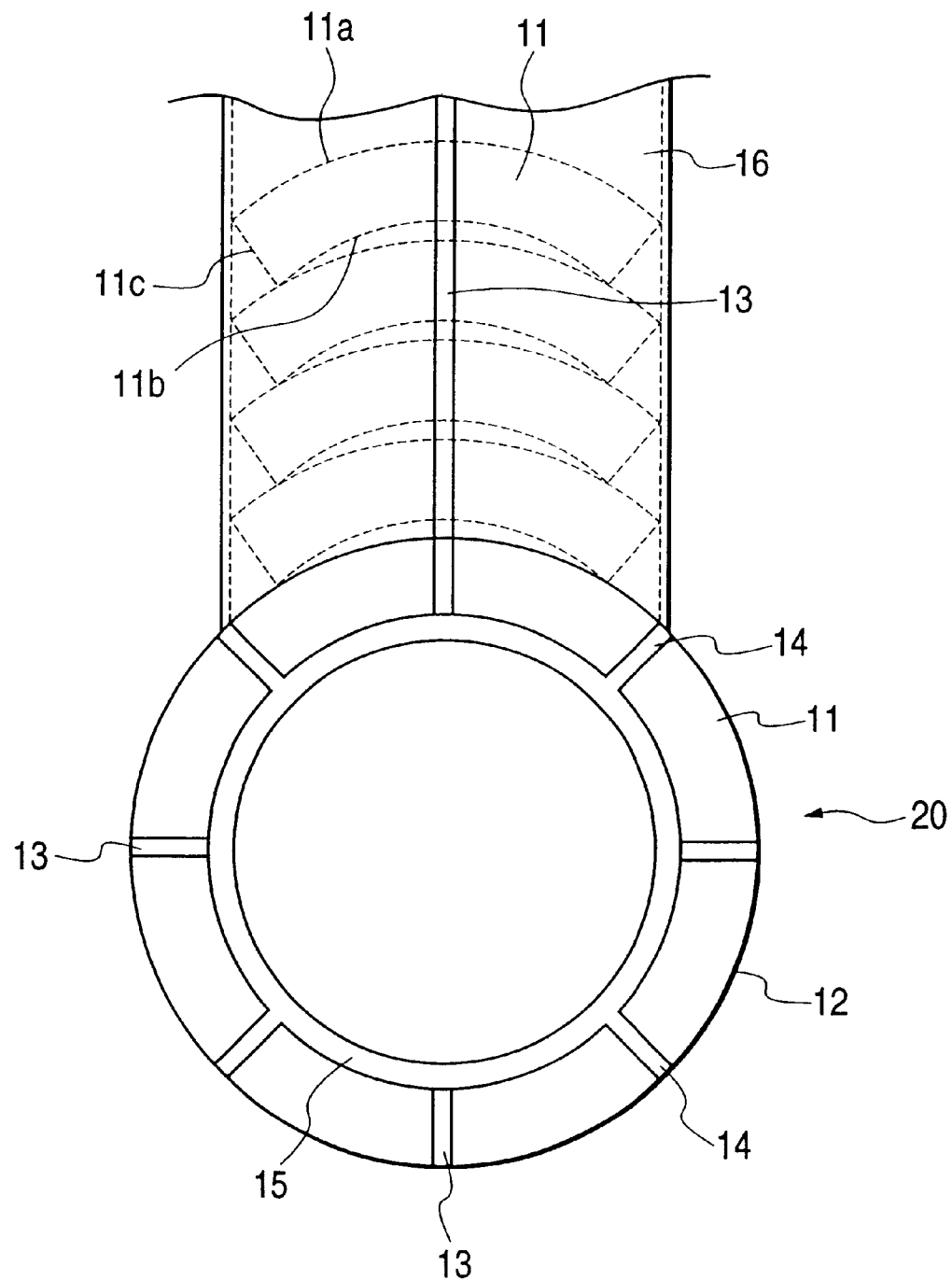
FIG. 1 shows a first embodiment of the present invention and is a plan view of the friction plate, showing the mode of adhesion of the friction material segments to the core plate.

FIG. 1 shows a first embodiment of the present invention and is a plan view showing the mode of punching plural friction material segments from a tape of the friction material and adhering the segments to an annular core plate. The band-shaped friction material, or the friction material tape 16, has predetermined thickness and width. Plural friction material segments 11 of a same shape are obtained for example by press punching of the friction material tape 16.

The friction material segment 11 has an arc shape, having a predetermined radial width and a predetermined circumferential width. The friction material segment 11 is composed of an external periphery portion 11a of a curvature same as that of the annular core plate 12, an internal periphery portion 11b, and circumferential edge portions 11c for connecting the external periphery portion 11a and the internal periphery portion 11b at both ends thereof in the circumferential direction.

The friction material segments 11 are adhered and fixed, for example with an adhesive material, to both top and rear faces of the core plate 12 or a face thereof. In the first embodiment shown in FIG. 1, four friction material segments 11 are fixed circumferentially to the core plate 12. At the adhesion, a predetermined gap is formed between the edges 11c of the friction material segments 11 to form oil grooves 14 for the lubricating oil in the automatic transmission.

As the width of the friction material segments 11 in the radial direction thereof is smaller than that of the core plate 11 in the radial direction thereof, a substantially annular groove 15 is formed on the core plate 12 after the adhesion of the friction material segments 11. This annular groove 15 communicates with the oil grooves 14. In case the friction material segments 11 are adhered on both faces of the core plate 12 respective grooves 15 are naturally formed on both faces thereof. As shown in FIG. 1, the friction material tape 16 is provided in advance with a groove 13 by plastic working such as pressing or roller pressing or cutting. Consequently, the groove 13 is formed in the friction material segment 11 at the preparation thereof for example by punching from the friction material tape 16. The groove 13 is provided at the approximate center of the friction material segment 11, penetrating through the segment in the radial direction. Consequently, after the adhesion of the friction material segments 11 on the core plate 12, the oil grooves 14 and the second oil grooves 13 are positioned radially, with a substantially constant pitch. The grooves 13 also communicate with the annular groove 15, thus communicating also with the oil grooves 14.

In the present embodiment, four friction material segments 11 are adhered to the core plate 12, but such number is not limited to four and may be selected otherwise. Also the groove 13 provided in the friction material tape 16 need not be limited to one but can also be provided in plural units.

The friction plate 20 formed by fixing the friction material segments 11 to the core plate 12 is lubricated with lubricating oil in the actual use, and the presence of the groove 15 communicating with the oil grooves 14 and the grooves 13 achieves smooth flow of the lubricating oil, thereby improving the lubricating ability. In particular, there is ensured smooth flow of the lubricating oil in the radial direction from the external periphery side to the internal periphery side of the friction plate 20 and in the opposite direction from the internal periphery side to the external periphery side.

Figure 2:
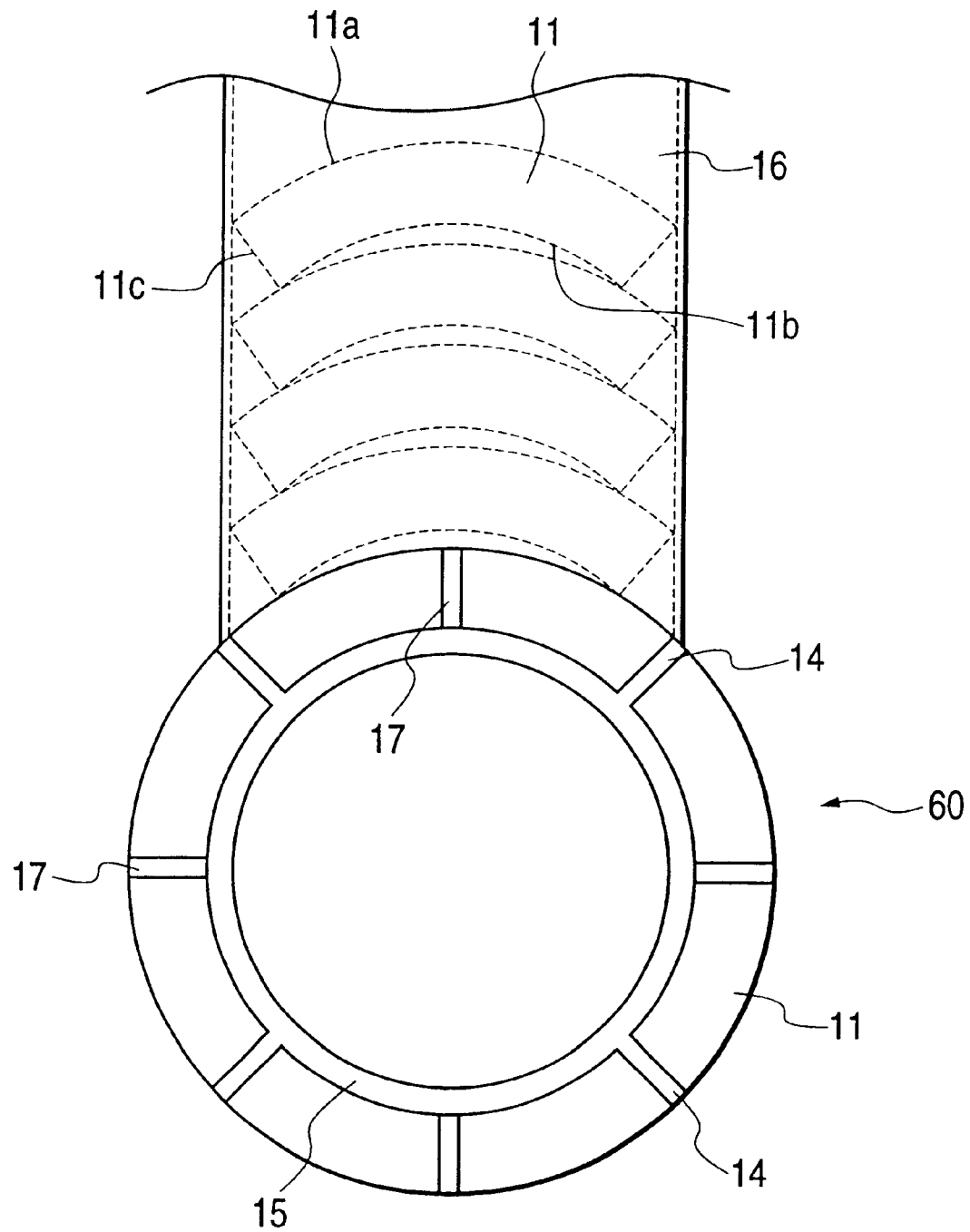
FIG. 2 shows a second embodiment of the present invention and is a plan view of the friction plate, showing the mode of adhesion of the friction material segments to the core plate.

FIG. 2 shows a second embodiment of the present invention and is a plan view showing the mode of punching plural friction material segments from the friction material tape and adhering the segments to the core plate. As the basic configuration is similar to that in the first embodiment, there will be explained the different points only.

The friction material segments 11 are adhered and fixed, for example with an adhesive material, to both top and rear faces of the core plate 12 or a face thereof. In the second embodiment, a groove 17 in the friction material segment 11 is not provided in advance on the friction material tape 16 but is formed by plastic working such as pressing at the punching of the friction material segment 11 from the friction material tape 16.

Consequently, after the adhesion of the friction material segments 11 on the core plate 12, the oil grooves 14 and the second oil grooves 17 are positioned radially, at a substantially constant pitch. The grooves 17 also communicate with the annular groove 15, thus communicating also with the oil grooves 14.

In the present embodiment, four friction material segments 11 are adhered to the core plate 12, but such number is not limited to four and may be selected otherwise. Also the groove 17 formed simultaneously with the punching need not be limited to one but can also be formed in plural units.

The friction plate 60 formed by fixing the friction material segments 11 to the core plate 12 is lubricated with lubricating oil in the actual use, and the presence of the groove 15 communicating with the oil grooves 14 and the grooves 17 achieves smooth flow of the lubricating oil, thereby improving the lubricating ability. In particular, there is ensured smooth flow of the lubricating oil in the radial direction from the external periphery side to the internal periphery side of the friction plate 60 and in the opposite direction from the internal periphery side to the external periphery side.

Figure 3:
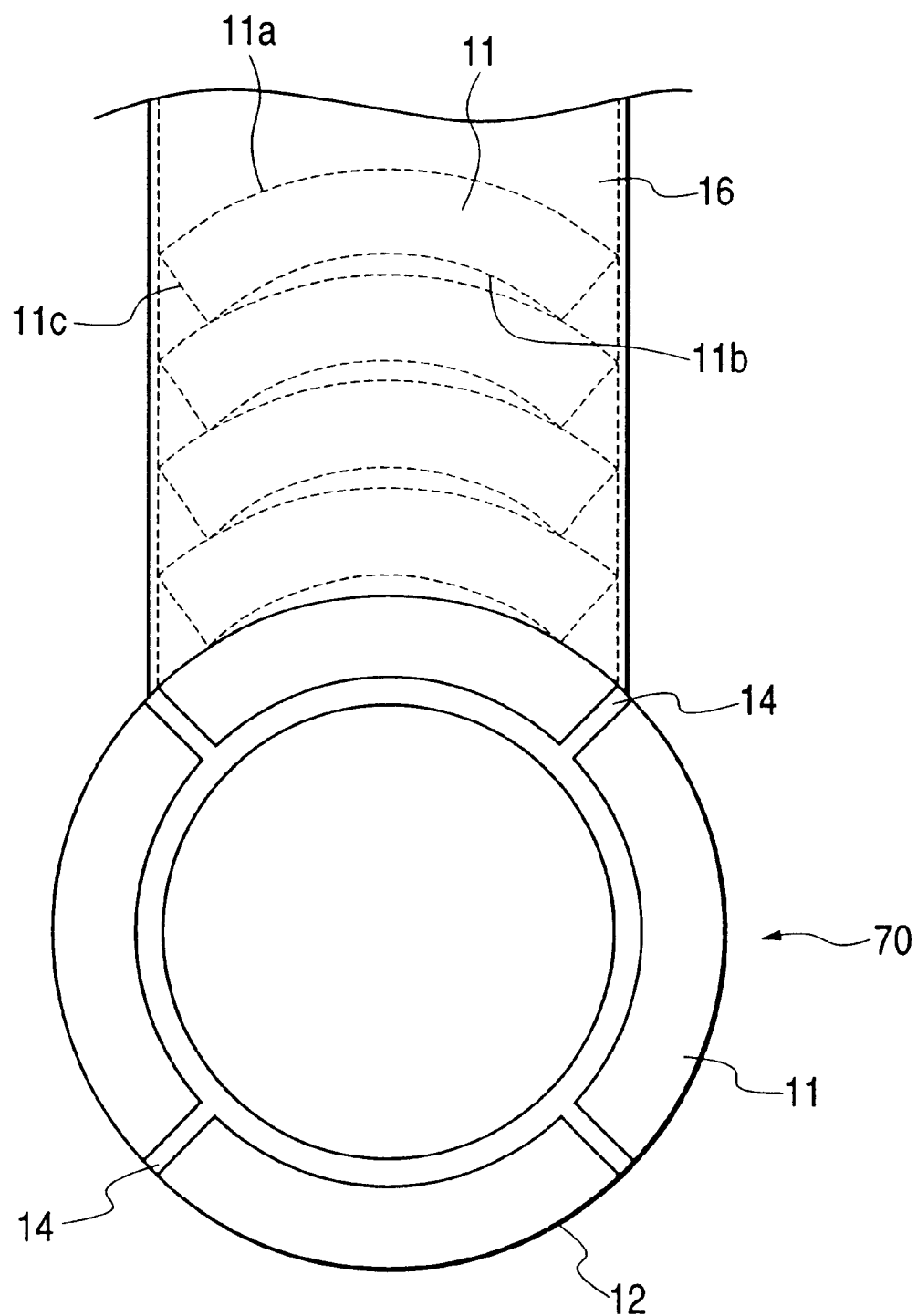
FIG. 3 shows a third embodiment of the present invention and is a plan view of the friction plate, showing the mode of adhesion of the friction material segments to the core plate.
Figure 4:
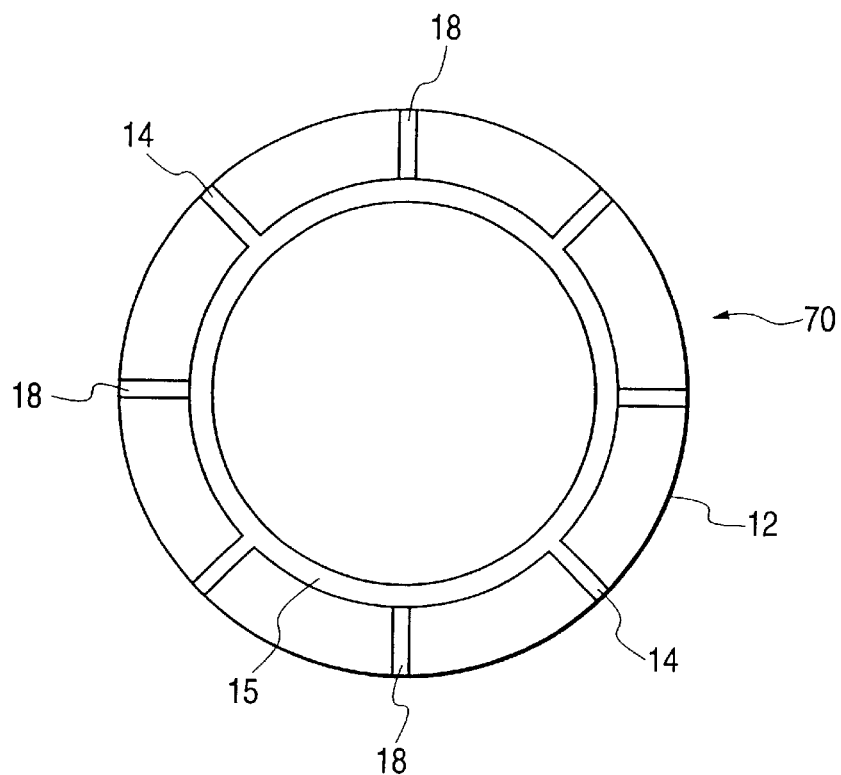
FIG. 4 is a plan view of the friction plate produced by the third embodiment.

FIGS. 3 and 4 show a third embodiment of the present invention. FIG. 3 is a plan view showing the mode of punching plural friction material segments from the friction material tape and adhering the segments to the core plate. FIG. 4 is a plan view of the completed friction plate 70. As the basic configuration is similar to that in the first embodiment, there will be explained the different points only.

The friction material segments 11 are adhered and fixed, for example with an adhesive material, to both top and rear faces of the core plate 12 or a face thereof. In the third embodiment, a groove 18 in the friction material segment 11 is not provided in advance on the friction material tape 16 nor formed at the punching of the friction material segment 11 for example by pressing from the friction material tape 16, but is formed by pressing, roller pressing or cutting after the friction material segment 11 is adhered to the core plate 12, namely at the final adhesion.

Consequently, after the adhesion of the friction material segments 11 on the core plate 12, the oil grooves 14 and the second oil grooves 18 are positioned radially, at a substantially constant pitch. The grooves 18 also communicate with the annular groove 15, thus communicating also with the oil grooves 14.

In the present embodiment, four friction material segments 11 are adhered to the core plate 12, but such number is not limited to four and may be selected otherwise. Also the groove 18 formed at the final adhesion need not be limited to one but can also be formed in plural units.

The friction plate 70 formed by fixing the friction material segments 11 to the core plate 12 is lubricated with lubricating oil in the actual use, and the presence of the groove 15 communicating with the oil grooves 14 and the grooves 18 achieves smooth flow of the lubricating oil, thereby improving the lubricating ability. In particular, there is ensured smooth flow of the lubricating oil in the radial direction from the external periphery side to the internal periphery side of the friction plate 70 and in the opposite direction from the internal periphery side to the external periphery side.

Figure 5:
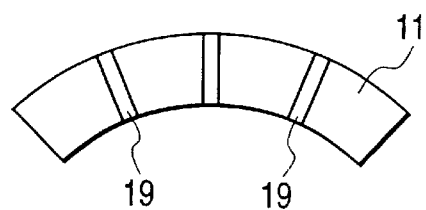
FIG. 5 is an elevation view of the friction material segments showing an example of the groove formed therein.
Figure 6:
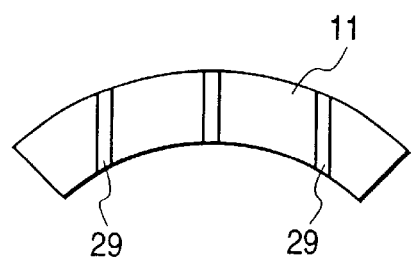
FIG. 6 is an elevation view of the friction material segments showing another example of the groove formed therein.

FIGS. 5 and 6 are elevation views of the friction material segment, showing examples of the arrangement of grooves in case of forming plural grooves on the friction material segment 11 for example by pressing. In FIG. 5, grooves 19 are formed on the friction material segment 11 in radial manner with a constant pitch in the circumferential direction. On the other hand, in FIG. 6, grooves 29 are formed in parallel manner. This configuration, allowing formation of plural grooves in a step, is suitable for example for roller pressing or cutting.

In FIGS. 5 and 6, three grooves are formed in a friction material segment 11, but another number may naturally be selected.

Figure 7:
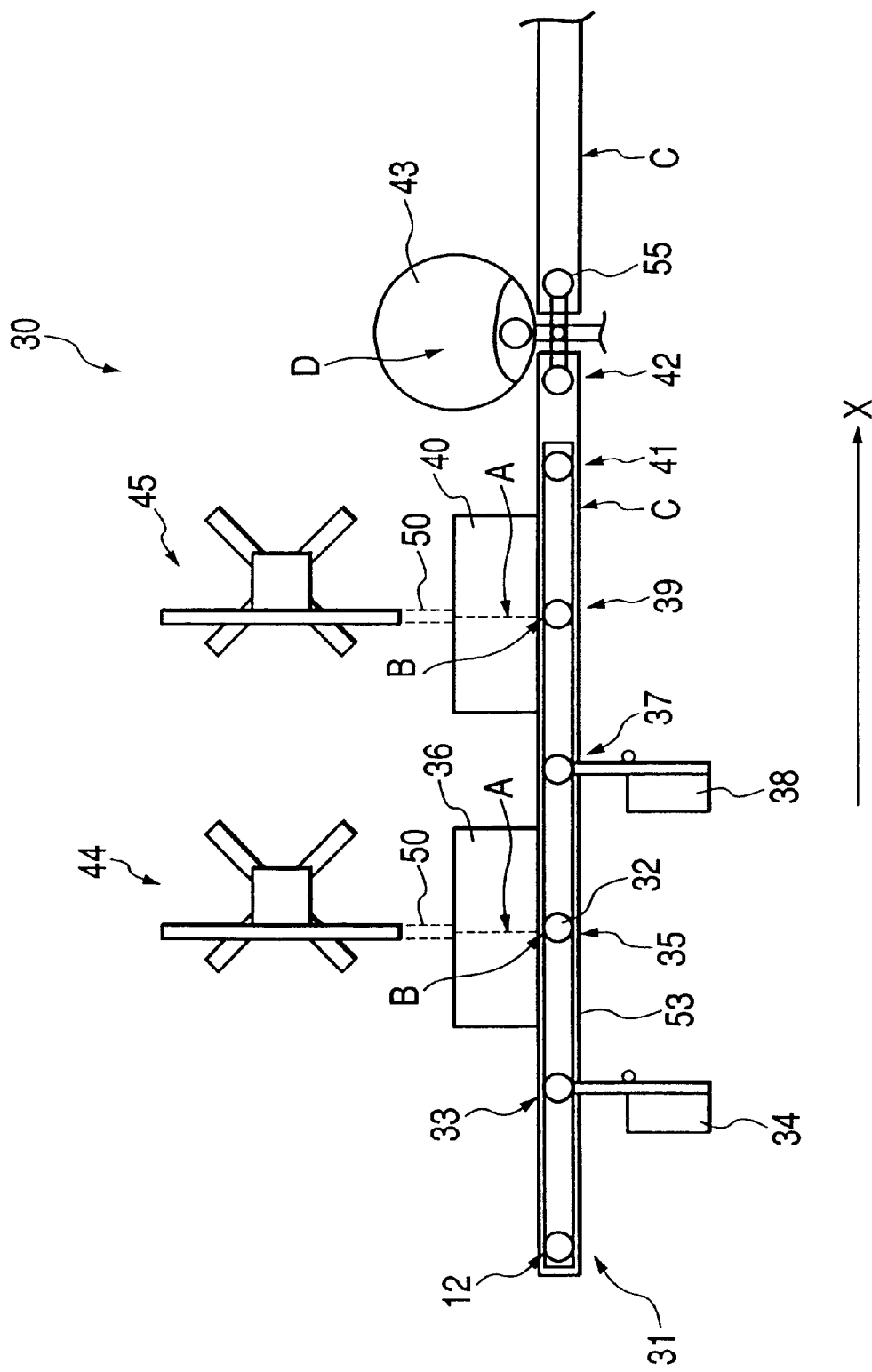
FIG. 7 is a view showing an apparatus for producing the friction plate of the respective embodiments.
Figure 8:
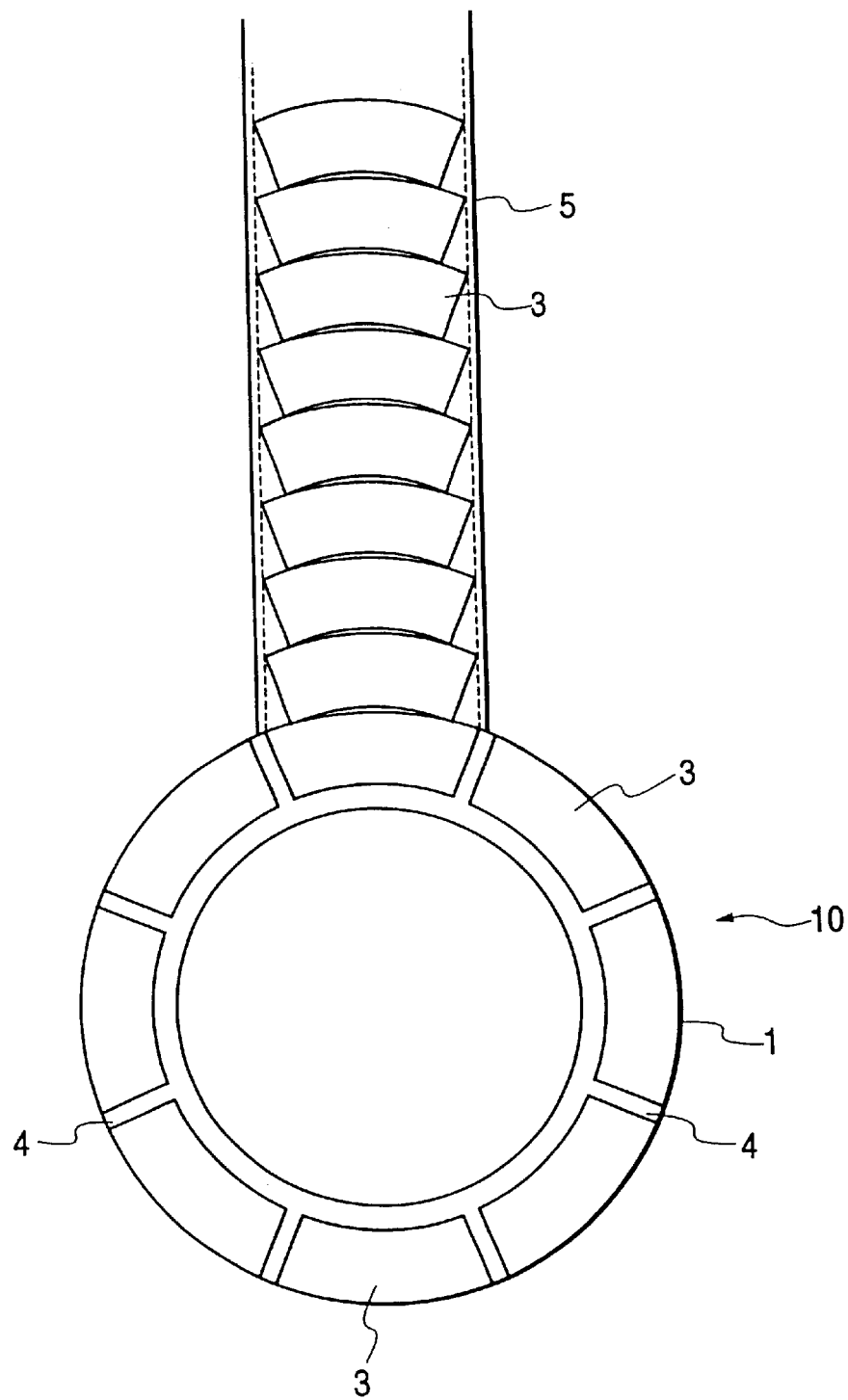
FIG. 8 is a plan view of the friction plate, showing a conventional method for producing the same.

FIG. 7 is a schematic view showing the entire configuration of an apparatus 30 for executing the methods for producing the friction plate of the foregoing embodiments. The core plate 12 is supplied from a core plate entry unit 31 of a transporting (transfer) line 53, and the supplied core plate 12 is transported in a direction X.

The core plate 12 is then subjected to the coating of the adhesive material on the lower face, by a first adhesive coating device 34 in a first coating unit 33 for coating the adhesive. The core plate, with the adhesive material coated on the lower face, is subjected, in a friction material adhesion unit 35, to the adhesion, on the lower face, of the friction material segments supplied from a first friction material supply device 44 through a lower face adhesion station 36.

Subsequently, the core plate 12 is subjected to the coating of the adhesive material on the upper face, by a second adhesive coating device 38 in a second coating unit 37 for coating the adhesive. The core plate 12, with the adhesive material coated on the upper face, is subjected, in a friction material adhesion unit 39, to the adhesion, on the upper face, of the friction material segments supplied from a second friction material supply device 45 through an upper face adhesion station 40. There are also shown friction material tapes 50 supplied from the friction material supply devices 44, 45.

The core plate 12, bearing the adhered friction material segments on the upper and lower faces, is transported to a discharge unit 41, then transported to an entry unit 42 for a post process, and is subjected to the simultaneous application of heat and pressure for 15 to 30 seconds for achieving final adhesion in a post process (final adhesion) unit 43 to provide the completed friction plate 55.

In FIG. 7, the groove 13 of the first embodiment is formed in a step A, while the groove 17 of the second embodiment is formed in a step B, and the groove 18 of the third embodiment is formed in a step D. In a step C, the groove is formed on the friction material segment after the adhesion thereof but prior to the final adhesion, or after the final adhesion.

As explained in the foregoing, the present invention provides the advantages of:

improving the throughput of the friction material; and reducing the time and process for fixing the friction material segments to the core plate.

What is claimed is:

1. A method for producing a friction plate having first and second pluralities of oil grooves communicating between the internal periphery and the external periphery, by fixing friction material segments formed from a friction material to a core plate, the method comprising:

forming said first plurality of oil grooves on a surface of said friction material by pressing said surface of said friction material, and forming said second plurality of oil grooves by fixation of said friction material segments with predetermined gaps therebetween to said core plate.

2. A method for producing a friction plate according to claim 1, wherein said first plurality of oil grooves are formed on the surface of said friction material with a heated press used for final adhesion after said friction material segments are fixed with gaps therebetween.

3. A method according to claim 1, wherein said pressing comprises roller pressing.

4. A method for producing a friction plate according to claim 1, wherein after said first plurality of oil grooves are formed by pressing of said friction material, said friction material segments are formed by punching, and said friction material segments with said predetermined gaps are fixed to said core plate.

5. A method for producing a friction plate according to claim 1, wherein said friction material of a band shape is punched and pressed to simultaneously form said friction material segments and said first plurality of oil grooves, and said friction material segments with said predetermined gaps are fixed to said core plate thereby forming said second plurality of oil grooves.

6. A method for producing a friction plate according to claim 1, wherein said friction material segments with said predetermined gaps are fixed to said core plate after said first plurality of oil grooves are formed by pressing said surface of said friction material.

* * * * *